United States Patent [19]
Hall et al.

[11] Patent Number: 6,033,641
[45] Date of Patent: *Mar. 7, 2000

[54] CATALYST FOR PURIFYING THE EXHAUST GAS FROM THE COMBUSTION IN AN ENGINE OR GAS TURBINES AND METHOD OF MAKING AND USING THE SAME

[75] Inventors: W. Keith Hall, Mill Run; Xiaobing Feng, Pittsburgh, both of Pa.

[73] Assignee: University of Pittsburgh of the Comonwealth System of Higher Education, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/634,233

[22] Filed: Apr. 18, 1996

[51] Int. Cl.$^7$ .............................. B01D 53/56; B01J 20/18
[52] U.S. Cl. ...................... 423/239.2; 502/66; 502/74; 502/71; 502/75
[58] Field of Search .................... 502/66, 71, 74, 502/75; 423/239.2

[56] References Cited

U.S. PATENT DOCUMENTS

| | | | |
|---|---|---|---|
| 3,013,990 | 12/1961 | Breck et al. | 502/74 |
| 4,255,349 | 3/1981 | Butter et al. | 502/71 |

FOREIGN PATENT DOCUMENTS

| | | | |
|---|---|---|---|
| 937750 | 9/1963 | United Kingdom | 502/75 |

| | | | |
|---|---|---|---|
| WO9406546 | 3/1994 | WIPO | |

OTHER PUBLICATIONS

J.N. Armor, "Catalytic removal of nitrogen oxides: where are the opportunities?", *Elsevier Science B.V.*, Catalysis Today 96, pp. 99–105 (1995).

(List continued on next page.)

*Primary Examiner*—Steven P. Griffin
*Assistant Examiner*—Peter DiMauro
*Attorney, Agent, or Firm*—Diane R. Meyers; Arnold B. Silverman; Eckert Seamans Cherin & Mellott, LLC

[57] ABSTRACT

This invention discloses a durable catalyst for internal combustion engine or power plant exhaust gas purification which is comprised of a zeolite as the support and Fe (II) base-exchanged cation as the active component for the $NO_x$ selective catalytic reduction (SCR). It has stable activity with up to 20% $H_2O$ and up to 250 ppm $SO_2$ and combinations thereof over many hours in the exhaust stream. It is resistant to temperature excursions up to about 1,000° C. The method of producing this catalyst preferably comprises ion-exchanging the zeolite with Fe (II) in an aqueous solution of iron (II) oxalate, iron (II) citrate or iron (II) formate, or a mixture of oxalic acid, citric acid/salts, formic acid/salts, 2,3,4,5,6-pentahydroxyl caproic acid/salts and iron (II) salts, for example, sulfate, nitrate, chloride, carboxylate, chloride acetate, phosphate and carbonate, in the pH range from 3 to 13 under anaerobic conditions. The catalyst produced in this way shows no noticeable deactivation in its activity for reducing $NO_x$ to $N_2$ under accelerated aging conditions (up to about 20% $H_2O$ and up to about 250 ppm $SO_2$ present in the mixture of NO, HC (iso-butane), and $O_2$) for at least 2,500 hours which meets the Government standard. A method of using this catalyst is also disclosed. Methane can be used satisfactorily as the reducing agent but in the temperature range of greater than 600° C. but less than 750° C.

19 Claims, 6 Drawing Sheets

U.S. PATENT DOCUMENTS

| | | | |
|---|---|---|---|
| 4,376,714 | 3/1983 | Pingaud | 423/632 |
| 4,539,122 | 9/1985 | Son et al. | 252/8.55 R |
| 4,665,042 | 5/1987 | Budge et al. | 502/66 |
| 5,017,538 | 5/1991 | Takeshima | 502/64 |
| 5,041,272 | 8/1991 | Tamura et al. | 423/239.2 |
| 5,139,992 | 8/1992 | Tauster et al. | 502/304 |
| 5,254,519 | 10/1993 | Wan et al. | 502/252 |
| 5,260,043 | 11/1993 | Li et al. | 423/239.2 |
| 5,451,387 | 9/1995 | Farnus et al. | 423/239.2 |
| 5,520,895 | 5/1996 | Sharma et al. | 423/239.2 |

OTHER PUBLICATIONS

A.P. Walker, "Mechanistic studies of the selective reduction of $NO_x$ over Cu/ZSM–5 and related systems", *Elsevier Science B.V.*, Catalysis Today 26, pp. 107–108 (1995).

J.N. Armor, "Catalytic reduction of nitrogen oxides with methane in the presence of excess oxygen: a review", *Elsevier Science B.V.*, Catalysis Today 26, pp. 147–158, (1995).

Monroe, D.R. et al., "Evaluation of a Cu/Zeolite Catalyst to Remove $NO_x$ from Lean Exhaust", *General Motors Research Labs*, SAE Report No. 930737 (1992).

CATALYST FOR PURIFYING THE EXHAUST GAS FROM THE COMBUSTION IN AN ENGINE OR GAS TURBINES AND METHOD OF MAKING AND USING THE SAME

BACKGROUND OF THE INVENTION

1. Field of the Invention

This invention relates to a catalyst for purifying the exhaust gas from the combustion of an engine with a lean air/fuel mixture containing excess oxygen, from gas turbines such as those used in power plants, and from diesel engines. In particular, it is a durable catalyst which can remove $NO_x$ very efficiently in the presence of water and sulfur dioxide in the exhaust gas. It also relates to a method of producing such a catalyst and its end use.

2. Description of Prior Art

The current technology for pollution abatement for vehicle exhaust streams involves the application of the so-called three-way catalysts (TWC's), which have a typical composition of $Pt/Rh/CeO_2/Al_2O_3$. The TWC's, which are able to simultaneously remove CO, hydrocarbons (HC), and $NO_x$ require approximately stoichiometric concentrations of oxidants and reductants (theoretical A/F=14.6) which may be controlled by incorporating an oxygen sensor. It is necessary for CO to be present in order to reduce $NO_x$ to $N_2$. Hence the engine must be operated under slightly rich air/fuel ratios which is energy inefficient. The use of noble metals in the TWC is not favored because they are very expensive.

U.S. Pat. No. 5,254,519 to Rabinowitz et al. discloses a three way catalyst with a composition of rare earth oxide on a zirconia support with a rhodium component and an activated alumina support with a platinum component.

U.S. Pat. No. 5,139,992 to Dettling et al. discloses a three way catalyst for internal combustion engines.

A lean burn air/fuel mixture is desired to reduce the consumption of fuel. Excess oxygen is used to achieve high energy efficiency of the automobile engine. Selective catalytic reduction (SCR) catalysts (e.g. CuZSM-5) have been developed to remove $NO_x$ from the exhaust gas of an engine operated under lean burn conditions, but they are not sufficiently durable to meet the 100,000 mile Government requirement.

U.S. Pat. No. 5,017,538 to Takeshina et al. discloses a CuZSM-5 catalyst as a SCR catalyst to purify exhaust gas under lean burn air/fuel ratios with hydrocarbons (except methane) as reductants and its preparation method.

U.S. Pat. No. 5,260,043 to Armor et al. discloses a CoZSM-5/CoFerrierite catalyst as a SCR catalyst to purify exhaust gases under lean burn air/fuel ratio with methane as the reductant and its method of preparation.

Even though CuZSM-5, CoZSM-5 and CoFerrierite catalysts have high activity for the SCR $NO_x$ reaction, their application in industry has been limited by their low durability and poisoning by the unavoidable water present in the combustion stream. The durability of the CuZSM-5 catalyst in the presence of water and $SO_2$ was evaluated by scientists and engineers in General Motor Research Labs. As a result, the CuZSM-5 catalyst was found to have very poor thermal stability (lost 80% of its initial activity in 4 hours). Monroe, D. R. et al. *SAE Report* No. 930737, 1992. The durability study of CoZSM-5 and CoFerrierite catalysts was performed by scientists at Air Product Co., and the research showed a substantial decrease in the $NO_x$ conversion in the presence of water and $SO_2$. Armor, J. N. *Catal. Today* 26, 147, 1995.

The most recent reviews in the area of $NO_x$ SCR claim that there is no catalyst which has both the required de-$NO_x$ activity and durability (against water and $SO_2$) for any practical usage. Walker, A. P., *Catal. Today* 26, 107, 1995. b) Armor, J. N. *Catal. Today* 26, 99, 1995. There are two reasons for this: a) a reversible poisoning by $H_2O$; and b) an irreversible breakdown of structure due to dealumination leading to hydrothermal sintering. CuZSM-5, CoZSM-5 and CoFerrierite deactivate very rapidly if $H_2O$ or $SO_2$ or both are present in the reaction stream. This is unavoidable in any combustion stream. With presently available technology, there is no way to prevent deactivation of CuZSM-5, CoZSM-5 and CoFerrierite catalysts.

The above catalysts are zeolites (crystalline aluminosilicates) that may be represented by the general formula:

Many zeolites which have different crystal structures, channel openings, and one or three dimensional arrangement of these channels are commercially available. The cation (M) exchange capacity depends on the tetrahedral aluminum content which creates negative charge on the framework of zeolite that must be compensated by cations, such as $H^+$ $Na^+$, $K^+$, $Cu^{2+}$, $Fe^{2+}$, $Co^{+2}$, $Co^{+3}$, $CuOH^+$, and $FeOH^+$ and many others.

However, the uniform crystal structure of zeolite is subject to attack by molecular water which eventually will break down the crystal structure of zeolite by breaking and reforming T—O—T bonds (T=Al, or Si). This break-down of the zeolite's structure removes tetrahedral aluminum from the lattice lowering its base-exchange capacity and destabilizing the lattice, destroys the porosity and channel framework, and deactivates the catalyst. It has been suggested in the art that the quick deactivation of CuZSM-5 catalyst in the presence of $H_2O$ is due to the combination of a) dealumination by steaming, b) zeolite crystallinity break down, and c) poisoning of the active sites by $H_2O$ and/or $SO_2$.

Therefore, in spite of these prior art disclosures, there remains a very real and substantial need for an internal combustion engine and power plant exhaust catalyst and process of making such catalyst that when used for a lean air/fuel mixture, it can remove $NO_x$ substantially with the same efficiency irrespective of the air-fuel ratio of the lean fuel mixture. There is also a great need for a catalyst with high-stability and durability against deactivation by water and sulfur dioxide during use.

SUMMARY OF THE INVENTION

The present invention has met the above described need.

The improved $NO_x$ removal catalyst for an internal combustion engine and power plant use comprises a zeolite as a support and Fe(II) ion-exchanged cations in the zeolite as an active component in the catalyst for changing $NO_x$ into $N_2$. The zeolite is selected from the group consisting of ZSM-5, Faujasite [X,Y], Ferrierite, and Mordenite. A problem commonly encountered with the base exchange of $Fe^{+2}$ cations into the zeolite is the spontaneous oxidation of $Fe^{+2}$ to the precipitated gel FeOOH. Hence efforts were made to exclude $O_2$ from the exchange system. In the present invention, use is made of an iron salt, the anion of which has a lower oxidation potential than $Fe^{+2}$. Thus, the catalyst is characterized as undergoing an aqueous oxidation reaction between dissolved oxygen and an anion selected from the group consisting of oxalate, citrate or formate anions to form $CO_2$. The catalyst is also characterized as having Fe(II) cations on its surface instead of Fe(III) cations after the aqueous oxidation reaction to form $CO_2$ during ion exchange. The Fe(II) cations are selected from the group consisting of $Fe^{+2}$, $Fe^{+2}(OH^-)$ and combinations thereof. The Fe(II) salts which form the Fe(II) cations are selected from the group consisting of Fe(II) sulfate, Fe(II) chloride, Fe(II) nitrate, Fe(II) acetate, Fe(II) citrate, Fe(II) oxalate, Fe(II) formate, Fe(II) phosphate, Fe(II) carbonate, and Fe(II) carboxylate. The catalyst is preferably FeZSM-5, FeFerrierite and FeMordenite. The catalyst is also characterized by a selective catalytic reduction efficiency of $\geq 95\%$ and a selectivity of $\geq 0.6$ when water is present during use. The oxalate, citrate and formate and 2,3,4,5,6-pentahydroxyl caproicate anions qualify on the basis of their low oxidation potentials; oxalic acid, citric acid/salts, formic acid/salts and 2,3,4,5,6-pentahydroxyl caproicate acid/salts may be added when the other Fe salts are used and performs the same function.

A method of making an improved $NO_x$ removal catalyst for internal combustion engines and gas turbines includes providing a zeolite selected from the group consisting of ZSM-5, Faujasite [X,Y], Ferrierite, Zeolite A, and Mordenite. The method includes the steps of employing an aqueous solution in the presence of oxalate, citrate, formate, or 2,3,4,5,6-pentahydroxyl caproicate anions, dissolving Fe(II) salts into Fe(II) cations and using ion-exchange to convey Fe(II) cations into the zeolite. Dissolved oxygen is reacted in the aqueous solution with the oxalate, citrate, formate, or 2,3,4,5,6-pentahydroxyl caproicate anions to form $CO_2$, while controlling the pH range from about 3 to 13 and employing anaerobic conditions during the ion exchange.

The Fe(II) salts employed in the ion exchange are selected from the group consisting of Fe(II) oxalate, Fe(II) sulfate, Fe(II) chloride, Fe(II) nitrate, Fe(II) carbonate, and Fe(II) phosphate, Fe(II) formate and Fe(II) carboxylate Fe(II) citrate in the presence of oxalic, citric or formic acid or others having strongly reducing anions. The zeolite carries Fe(II) cations selected from the group consisting of $Fe^{+2}$, $Fe^{+2}(OH^-)$ and combinations thereof. The catalyst converts $NO_x$ into $N_2$ in the exhaust streams. The catalyst resists deactivation by pollutants selected from the group consisting of up to about 20% $H_2O$, up to about 250 ppm $SO_2$ and combinations thereof. The efficiency and selectivity of selective catalytic reduction of the catalyst are $\geq 95\%$ and $\geq 0.6$ when water is present in the reactant stream. The method preferably employs FeZSM-5, FeFerrierite and FeMordenite as the catalyst. The catalyst is used over a temperature range of about 200° C. to 800° C. in the exhaust stream. The catalyst can be employed up to 2,500 hours, equivalent to 100,000 miles at a speed of 40 miles per hour, to convert $NO_x$ in the exhaust stream into $N_2$. The catalyst is employed to wash coat a cordierite monolith used in catalytic converters.

The method of using an $NO_x$ removal catalyst in internal combustion engines and in gas turbines comprises coating cordierite monoliths with a zeolite selected from the group consisting of ZSM-5, Faujasite [X,Y], Ferrierite, and Mordenite and using Fe(II) cations in the form of $Fe^{+2}$ and $Fe^{+2}(OH^-)$ ions and combinations thereof exchanged as the active component of the zeolite. Employing the catalyst to resist deactivation by pollutants selected from the group consisting of up to about 20% $H_2O$, up to about 250 ppm $SO_2$ and combinations thereof. Using the catalyst over a temperature range of about 200° C. to 1,000° C. in the exhaust stream. The catalyst can be used for at least 2,500 hours (equivalent to 100,000 miles at an average speed of 40 miles per hour) to convert $NO_x$ to $N_2$.

It is an object of this invention to provide a catalyst for purification of exhaust gases for lean burn combustion engines and gas turbines.

It is an object of this invention to provide a durable catalyst able to withstand $H_2O$ in the exhaust stream both from the standpoint of structure and resistance to poisoning.

It is an object of this invention to provide a durable catalyst able to withstand $SO_2$ in the exhaust stream.

It is an object of this invention to provide a method to remove $NO_x$ from said exhaust gases.

It is an object of this invention to convert more than 95% $NO_x$ to $N_2$ with the catalyst of this invention.

It is an object of this invention to provide a method and related product wherein the Fe (II) ions are carried into the support zeolite with iron oxalate, citrate, 2,3,4,5,6-pentahydroxyl caproicate or formate anions or the Fe (II) salts are carried in with an oxalic acid mixture.

It is an object of this invention to have a system wherein the oxalate, citrate, formate, or 2,3,4,5,6-pentahydroxyl caproicate anions or other easily oxidizable anions protect Fe (II) from oxidation to Fe (III) during the exchange process.

It is an object of this invention to have a method and related product wherein the catalyst prepared in the presence of Fe (II) and reducing anions has higher than 100% Fe (II) loading where the exchange percentage is defined by assuming one $Fe^{+2}$ replaces two $Na^+$.

It is an object of this invention to have a method and related product wherein the hydrolyzed Fe (II) ions in the form of $Fe^{+2}(OH^-)$ raise the ion exchange level to 150% or higher.

It is an object of this invention to provide a method and related product for purification of exhaust gases for power plants.

These and other objects of the invention will be more fully understand from the following descriptions of the invention, the drawings and the claims appended hereto.

DESCRIPTION OF THE PREFERRED EMBODIMENT

The $NO_x$ removal exhaust gas catalyst comprises a zeolite as a support and Fe(II) ion-exchanged cations in the zeolite as an active component in the catalyst for converting $NO_x$ into $N_2$. The zeolite is selected from the group consisting of ZSM-5, Faujasite [X,Y], Ferrierite, and Mordenite. The catalyst is characterized as undergoing an aqueous oxidation reaction between dissolved oxygen and oxalate, citrate, formate, or 2,3,4,5,6-pentahydroxyl caproic anions to form $CO_2$ during ion-exchange. The catalyst is also characterized as being capable of providing Fe(II) cations on its aluminum T-sites instead of Fe(III) cations or Fe(II) admixed with a separate phase of FeOOH or $Fe_2O_3$ after the aqueous oxidation reaction during ion exchange. The Fe(II) cations are selected from the group consisting of $Fe^{+2}$, $Fe^{+2}(OH^-)$ and combinations thereof. The Fe(II) salts are selected from the group consisting of Fe(II) sulfate, Fe(II) chloride, Fe(II) nitrate, Fe(II) acetate, Fe(II) citrate, Fe(II) oxalate, Fe(II) formate, Fe(II) phosphate, Fe(II) carbonate, and Fe(II) carboxylate in the presence of oxalic, citric, or formic acid or others having strongly reducing anions. The catalyst is preferably FeZSM-5, FeFerrierite, and FeMordenite. The catalyst is also characterized by having a selective catalytic reduction efficiency of $\geq 95\%$ and a selectivity of $\geq 0.6$ when water is present during use.

A method of making an $NO_x$ removal catalyst for internal combustion engines or power plants comprises employing a zeolite selected from the group consisting of ZSM-5, Faujasite [X,Y], Ferrierite, and Mordenite. The method also employs an aqueous solution in the presence of oxalate, citrate, 2,3,4,5,6-pentahydroxyl caproicate or formate anions to dissolve Fe(II) salts into Fe(II) cations and uses ion-exchange to carry Fe(II) cations into the zeolite. Dissolved oxygen is reacted in the aqueous solution with the oxalate, citrate, 2,3,4,5,6-pentahydroxyl or formate anions to form $CO_2$, while controlling the pH range from about 3 to 13 and employing anaerobic conditions during the ion exchange.

Without the oxalate, citrate, 2,3,4,5,6-pentahydroxyl caprociate or formate anion, part of the Fe (II) is reacted to Fe (III) and precipitated on the surface of ZSM-5 as FeOOH. Thus the ion exchange process would be severely inhibited. The ion exchange of Fe (II) is limited in these cases and maximum exchange levels of Fe (II) seldom exceed 70% with ZSM-5, even on repeated exchange.

The catalyst converts $NO_x$ into $N_2$ in the exhaust stream. The catalyst resists deactivation by pollutants selected from the group consisting of up to about 20% $H_2O$, up to about 250 ppm $SO_2$ and combinations thereof. The efficiency and selectivity of selective catalytic reduction of the catalyst are $\geq 95\%$ and $\geq 0.6$ when water is present in the reactant stream. The method preferably employs FeZSM-5, FeFerrierite and FeMordenite as the catalyst. The catalyst is used over a temperature range of about 200° C. to 1,000° C. in the exhaust stream. The catalyst can be employed for at least 2,500 hours to convert $NO_x$ into $N_2$. This corresponds to 100,000 miles at 40 mph. The catalyst can be used to coat a cordierite monolith support frequently used in a vehicle exhaust system.

The Fe (II) ZSM-5 prepared in this invention has Fe (II) exchange level of at least 150% and higher, which is much greater than the stoichiometric amount for one Fe (II) to compensate two aluminum sites in ZSM-5 framework. The hydrolysis of Fe (II) to $Fe^{2+}(OH^-)$, as disclosed in FIG. 1, allows a stoichiometric exchange level up to the 200% level.

The catalyst prepared in this invention has high activity for purifying exhaust gas of a combustion engine or turbine with lean air fuel ratios and it is exceedingly durable, being virtually unaffected by the gas composition normally present in combustion streams. Under the same conditions, the catalyst in this invention had the greater activity than the CuZSM-5 catalyst at low temperatures and high space velocities and much higher in the presence of combustion water.

The catalyst of this invention can be used for $NO_x$ removal from the exhaust gas from internal combustion and diesel engines and from a gas turbine. The catalyst of this invention has adequate activity for purifying exhaust gas of a power plant using methane as a reductant for an $NO_x$ SCR reaction although higher temperatures are required for $CH_4$ than for other hydrocarbons.

The catalyst of this invention showed high activity and durability for purifying exhaust gas (in high concentrations of water and sulfur dioxide) normally formed by the combustion process within the engine in a simulated exhaust gas stream typical of a lean burn engine. No observable deactivation of catalytic activity over $NO_x$ SCR reaction has been found in the accelerating deactivation testing for at least 2,500 hours. Furthermore, the selectivity of the SCR reaction, which is defined as the ratio of hydrocarbon consumption in $NO_x$ conversion to the total hydrocarbon consumption (including consumption of both $NO_x$ conversion and combustion), is improved by the addition of $H_2O$ in the reactant stream. The addition of $H_2O$ tends to inhibit the combustion of hydrocarbon. At the same time, water showed no effect on the conversion of $NO_x$ to $N_2$. Selectivity in the test was 0.61, and was 0.27 in the absence of $H_2O$.

Various types of zeolites are known including those shown in TABLE I.

TABLE 1

Inlet diameters and network structures of supercages of principal types of zeolites

| Name | Number of atoms forming oxygen rings | Inlet diameter (Å) | Supercage structure |
| --- | --- | --- | --- |
| ZSM-5 | 10 | 5.4 × 5.6 | Three-dimensional |
|  | 10 | 5.1 × 5.5 |  |
| Faujasite (X, Y) | 12 | 7.4 | Three-dimensional |
| Ferrierite | 10 | 4.3 ×. 5.5 | Three-dimensional |
|  | 8 | 3.4 × 4.8 |  |
| Mordenite | 12 | 6.7 × 7.0 | One-dimensional |

Preferably ZSM-5, Ferrierite or Mordenite is employed for producing the catalyst of this invention. The preparation and characterization of ZSM-5 have been described in, for example, the article of G. T. Kokotailo, S. L. Lawton, and D. H. Olson entitled "Structure of synthetic Zeolite ZSM-5", Nature, Vol. 272, page 437 (Mar. 30, 1978), which is incorporated by reference. ZSM-5 has a wide range of Si/Al ratios varying from about 11 to infinity. Higher Si/Al ratios lead to more stable, more hydrophobic catalysts; ZSM-5 is hydrophobic, especially those with high silicate content. This invention is not, however, limited to ZSM-5. Other zeolitic materials are also effective (see TABLE I hereinabove). Other yet untested zeolites may also be useful.

EXAMPLE 1

Preparation of FeZSM-5 with $FeC_2O_4 \cdot 2H_2O$

Figure 1:
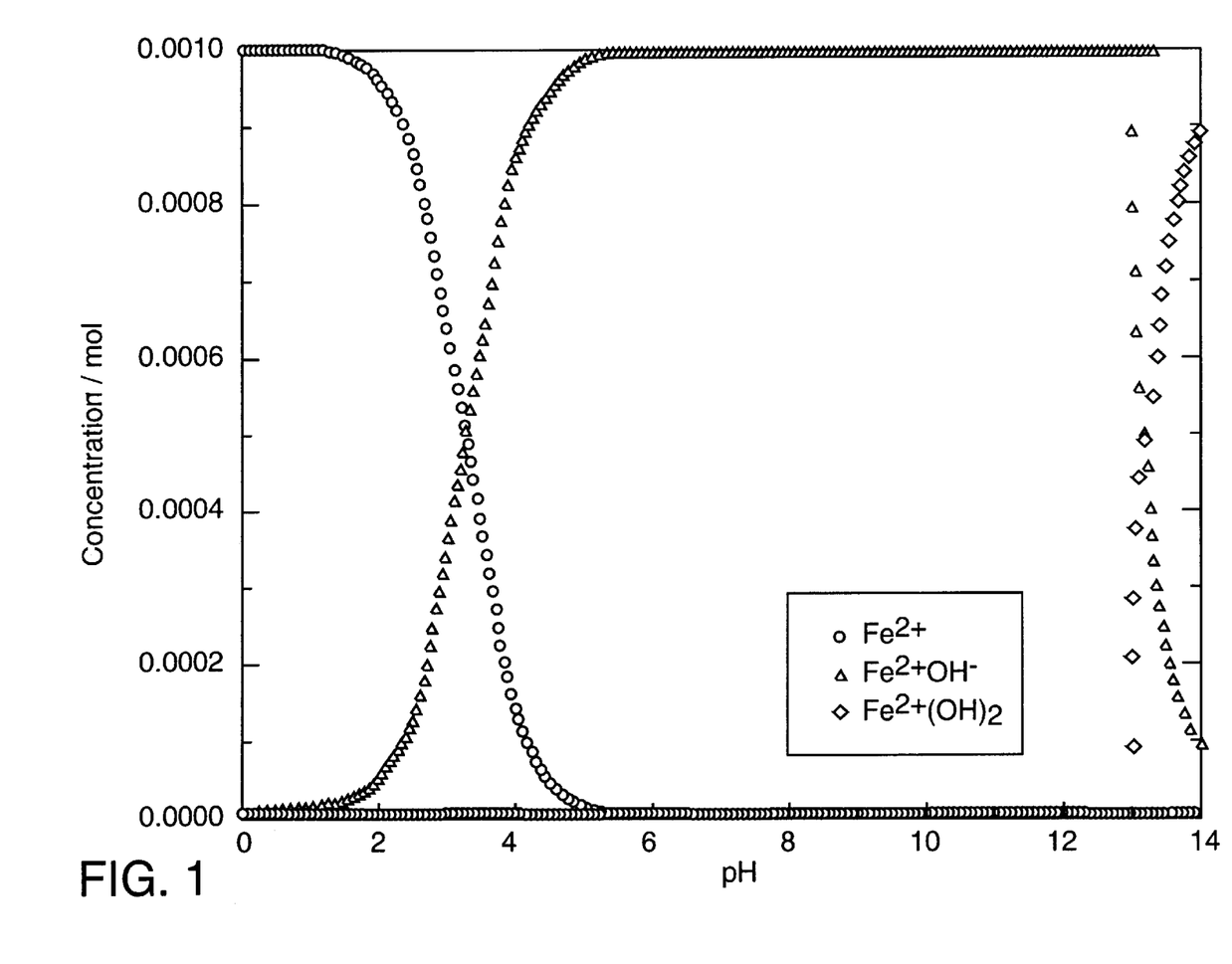
FIG. 1 is a plot of the relationship between the concentration of $Fe^{2+}$, $Fe^{2+}(OH^-)$, $Fe^{2+}(OH)_2$ and the pH of a $10^{-3}$ molar (saturated) $FeC_2O_4$ aqueous solution at 25° C.

The apparatus used for ion exchange of Fe (II) with ZSM-5 zeolite was a coarse porous borosilicate disc filter placed in between two containers to provide the necessary diffusion of ions between the two containers while preventing passage of solids. An inert gas atmosphere was produced by bubbling UHP $N_2$ or He in either container to flush air out of both containers. Stirring was provided either by this bubbling or by magnetic stirring. The pH was controlled by adding 0.1 M NaOH solution or 0.1 M sulfuric acid. Two grams of NaZSM-5-11-100 were added in 250 ml DI water in container I, and 2 grams of Fe (II) oxalate were added to container II forming a saturated solution in equilibrium with excess solid $FeC_2O_4.2H_2O$. The $Fe^{2+}$, $C_2O_4^{2-}$ and $Na^+$ ions can easily diffuse through the fitted disc into both containers for the entire exchange period of 24 hours. The ionic composition present during exchange is shown in FIG. 1. The catalyst FeZSM-5 was obtained by filtration; after washing with DI water, it was dried and then calcined at a temperature of 500° C. Analysis revealed that it was FeZSM-5-11-159. (The catalysts are designated by their Si/Al ratio and extent of exchange, e.g., CuZSM-5-11-175 etc.)

EXAMPLE 2

Preparation of FeZSM-5 with $FeSO_4/H_2C_2O_4$

Two grams of NaZSM-5-11-100 were added in 250 ml of DI water in container I, and 0.5 gram oxalic acid was added to container II. Then, two grams of Fe (II) acetate were added to container II after 15 minutes bubbling of He to remove air in both containers. The catalyst of FeZSM-5-11-188 was prepared as described in Example 1.

EXAMPLES 3–7

Preparation of FeZSM-5 with Fe (II) Salts/$H_2C_2O_4$

TABLE II hereinbelow discloses examples of conditions where FeZSM-5 catalyst in this invention was prepared by ion exchanging ZSM-5 with a mixture of Fe (II) salts and oxalic acid. In container I, oxalic acid was dissolved in DI water. In container II, ZSM-5 was added to DI water. Various Fe (II) salts were added to container I (example 3) or container II (examples 4 and 7) after 15 minutes bubbling of inert gas, e.g. $N_2$ to remove air in both containers. The catalysts were obtained by filtration, fully washing with DI water, dried, then calcined at a temperature of 500° C.

TABLE II

Catalysts for Purifying Exhaust Gas*

| | Parent Zeolite | Fe (II) salt solution (M) | Oxalic acid solution (M) | Fe exchange level of FeZSM-5 (%) |
|---|---|---|---|---|
| Example 3 | NaZSM-5-11-100 | Fe (II) sulfate (0.1M) | 0.01 | 175 |
| Example 4 | NaZSM-5-20-100 | Fe (II) sulfate (0.001M) | 0.001 | 165 |
| Example 5 | NaZSM-5-11-100 | Fe (II) sulfate (0.01M) | 0.01 | 183 |
| Example 6 | NaZSM-5-11-100 | Fe (II) chloride (0.01M) | 0.01 | 178 |
| Example 7 | NaZSM-5-11-100 | Fe (II) acetate (0.01) | 0.01 | 191 |

*All catalysts in this table have NO to $N_2$ conversion of 95% at 500° C. in the conditions stated in example 8.

EXAMPLE 8

Catalytic Activity of FeZSM-5 Catalyst

FeZSM-5 catalysts have been tested for the efficiency of purifying exhaust gas of an engine with a lean air fuel mixture under the following conditions:

Exhaust gas: 1900 ppm NO, 1890 ppm iso-butane, 3% $O_2$, and 77% He for makeup gas with a space velocity of 40,000 $h^{-1}$. $CO_2$ may be also substituted for He without effect.

Catalyst: Fifty mg FeZSM-5-20-183 loaded in a fix bed reactor with a preheater of 200 mg of silica-gel.

Analysis: A TCD detector on line with a molecular sieve column for analyzing $N_2$ formation and a FID with a packed column for analysis of hydrocarbons.

Figure 2:
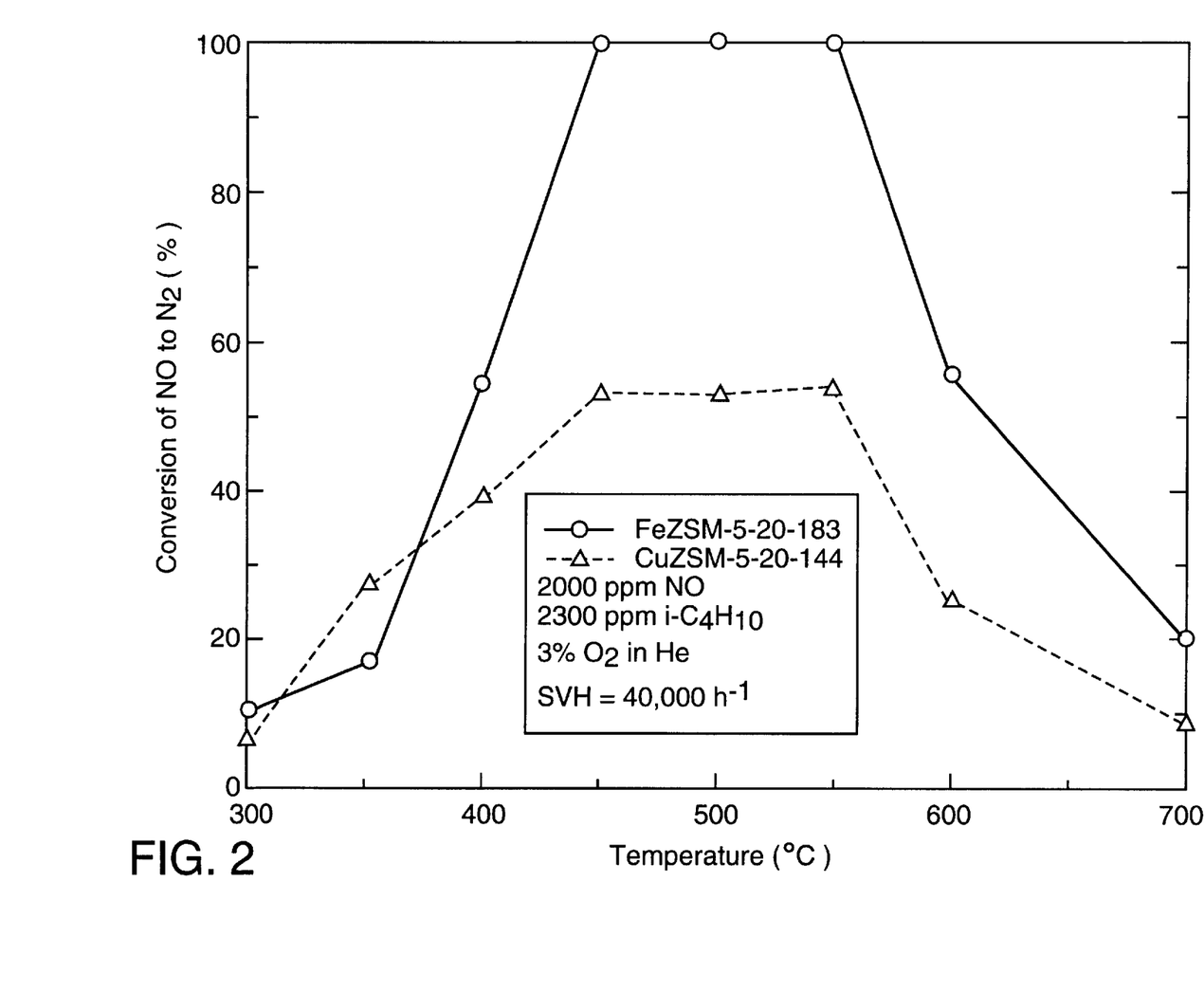
FIG. 2 is a plot of the removal of $NO_x$ by a catalyst embodying this invention contrasted with that of CuZSM-5 over a temperature range from 200 to 600° C. in dry gas stream.

The results are shown in FIG. 2. The catalyst in this invention shows higher activity for purifying exhaust gas over a 100° C. temperature range than the CuZSM-5 catalyst used as a comparison.

EXAMPLE 9

Catalytic Activity of FeZSM-5 Catalyst with Methane as Reductant

FeZSM-5 catalysts have been tested for the efficiency of purifying exhaust gas with methane as reductant.

Exhaust gas: 2000 ppm NO, 8000 ppm methane, 3% $O_2$, and 77% He for the makeup gas with a space velocity of 45,000 $h^{-1}$.

Catalyst: Same as Example 8.

Analysis: Same as Example 8.

With methane used as reductant, $NO_x$ to $N_2$ conversion reached 100% at temperature 650 to 750° C.

EXAMPLE 10–12

Catalytic Activity of FeFerrierite Catalyst

FeFerrierite catalysts have been tested for the efficiency of purifying exhaust gas with different hydrocarbons as reductant.

Exhaust gas: 8000 ppm methane (Example 10), or 2000 ppm iso-butane (Example 11), or 2700 ppm propene (Example 12), plus 2000 ppm NO, 3% $O_2$, and 77% He for the makeup gas with a space velocity of 45,000 $h^{-1}$.

Catalyst: Fifty mg FeFerrierite-8.6-150 is loaded in a fix bed reactor mixed with 200 mg of silica-gel.

Analysis: Same as Example 8.

With methane (Example 10), iso-butane (Example 11), propene (Example 12) as reductant, $NO_x$ to $N_2$ conversion reached 100% at temperature 600 to 750° C., with all hydrocarbons in contrast with the behavior of FeZSM-5.

EXAMPLE 13

Durability Test of FeZSM-5 Catalyst in the Presence of Both $H_2O$ and $SO_2$ Compared to the CuZSM-5 Catalyst Typical vehicle engine exhaust gas in the combustion products of lean burn air/fuel mixture contains 300 ppm NO, 300 ppm CO, 20 ppm $SO_2$, 800 ppm HC (calculated in the form of $C_3H_6$), 5% $O_2$, 10% $H_2O$, and $N_2$ and $CO_2$ corresponding to the material balance. The catalyst needs to be sufficiently durable and active over 100,000 miles (or 2500 hr., @ 40 mph) without serious deterioration. The catalysts embodying this invention were tested for the purification of exhaust gas under the following accelerated conditions:

Exhaust gas: 20% $H_2O$, 1900 ppm NO, 1980 ppm of iso-butane, 3% $O_2$, 150 ppm $SO_2$, and 77% $N_2$ or He for makeup gas with a SV=40,000 $h^{-1}$.

Catalyst: Fifty mg FeZSM-5-20-183 loaded in a fix bed reactor with 200 mg of silica-gel.

Figure 5:
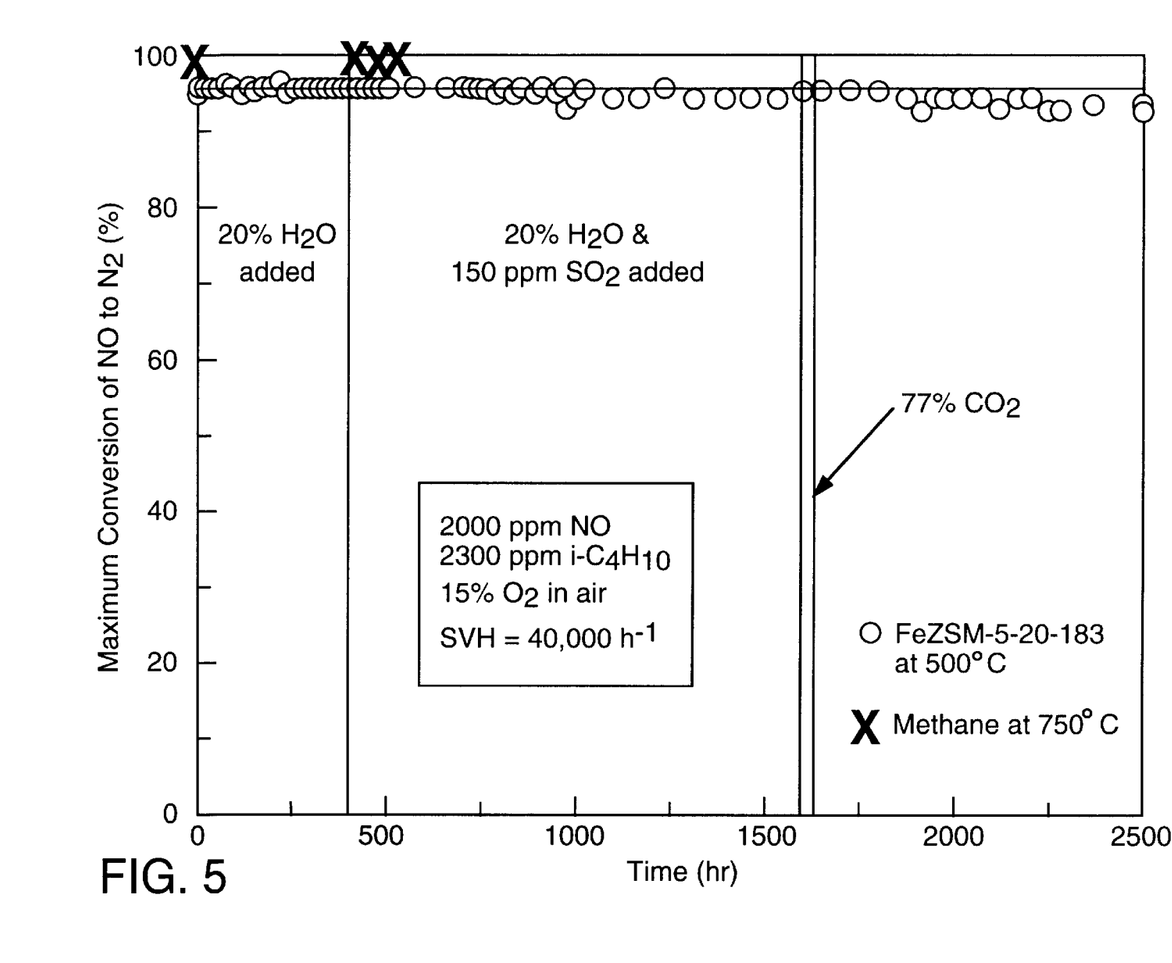
FIG. 5 shows the minimal effect of $SO_2$ and $H_2O$ on $NO_x$ removal activity of a catalyst embodying this invention over a time period of 2,500 hours; 75% $CO_2$ was substituted for inert gas in the stream containing both $H_2O$ and $SO_2$ without a noticeable effect.

Analysis: A TCD detector on line with a molecular sieve column for analyzing $N_2$ formation and a FID detector with a packed column for analysis of hydrocarbons. The results are shown in FIG. 5 for 2,500 hours.

EXAMPLE 14

Durability Test of FeZSM-5 Catalyst with a Simulated Exhaust Gas Stream Containing $H_2O$ and $SO_2$ with Methane as Reductant Exhaust gas: 20% $H_2O$, 150 ppm $SO_2$, 2000 ppm NO, 8000 ppm methane, 3% $O_2$ and 77% He for the makeup gas with a space velocity of 45,000 $h^{-1}$.

Catalyst: Same as Example 8.

Analysis: Same as Example 8.

The results are shown in FIG. 5 for 500 hours.

Figure 3:
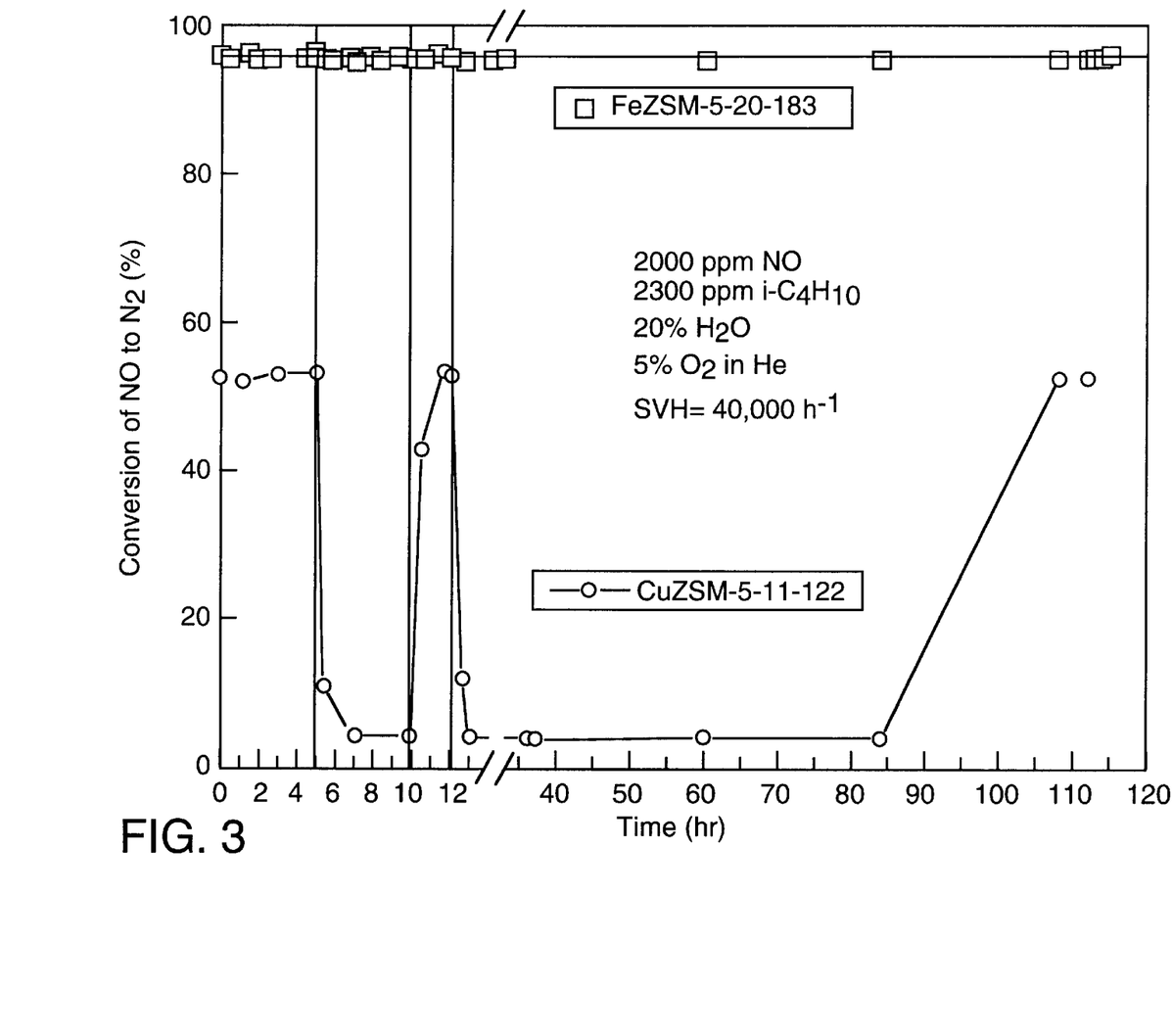
FIG. 3 is a plot of the effect of added $H_2O$ on $NO_x$ removal activity of a catalyst embodying this invention in contrast to that of a CuZSM-5 catalyst, used for purposes of comparison.

The results are shown in FIGS. 3 to 6. In FIG. 3, catalyst FeZSM-5-20-183 showed no deactivation with addition of 20% water to the feeding stream, in contrast with CuZSM-5 catalyst, where more than 90% of its activity was lost once 20% water was added. Over a time period of 200 hours, no deactivation of this FeZSM-5 catalyst was observed. In contrast, the CuZSM-5 catalyst had retained only 10% of its activity during the water treatment. Most of the lost activity was recovered when water was removed from the stream. The addition of $H_2O$ improved the hydrocarbon selectivity of the FeZSM-5 catalyst. TABLE III hereinbelow shows that the ratio of hydrocarbon consumption for $NO_x$ conversion to total hydrocarbon consumption over FeZSM-5 catalyst increased by a factor of 2 when water was added. This improvement of hydrocarbon selectivity is obviously favored for the practical application of FeZSM-5 catalyst in the $NO_x$ selective catalytic reduction. The effect of $CO_2$ on this $NO_x$ SCR catalyst has been tested with 77% $CO_2$ substituting for the carrier He in the feeding stream for 24 hours, there was no deactivation observed.

TABLE III

| FeZSM-5-20-183 @ 500° C. | | | |
|---|---|---|---|
| | 0% $H_2O$ | 20% $H_2O$ | 20% $H_2O$ and 150 ppm $SO_2$ |
| Selectivity | 0.27 | 0.61 | 0.61 |

Figure 4:
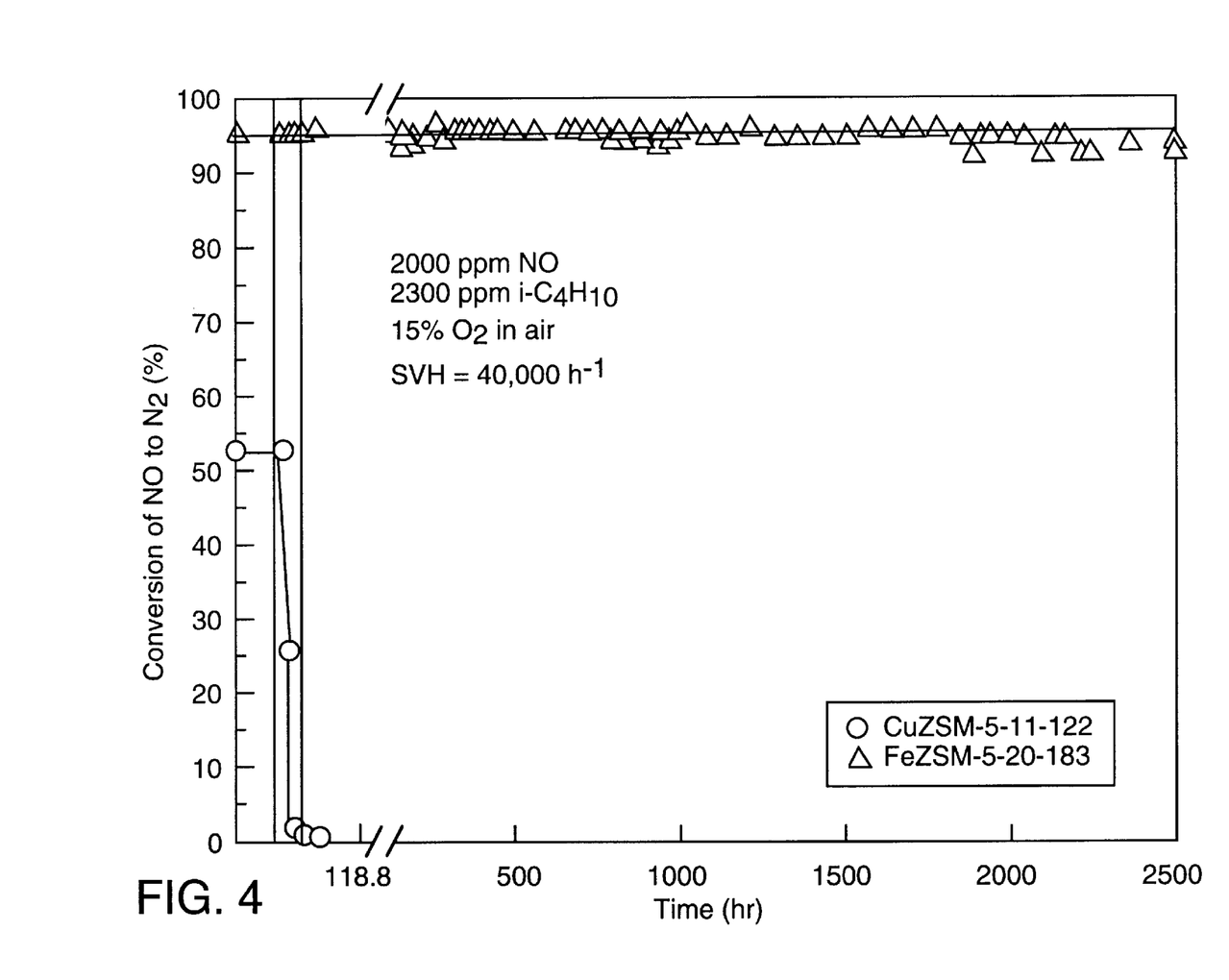
FIG. 4 shows the absence of an effect of $SO_2$ and $H_2O$ on the $NO_x$ removal activity of a catalyst embodying this invention in contrast with that of a CuZSM-5 catalyst used for the purpose of comparison.
Figure 6:
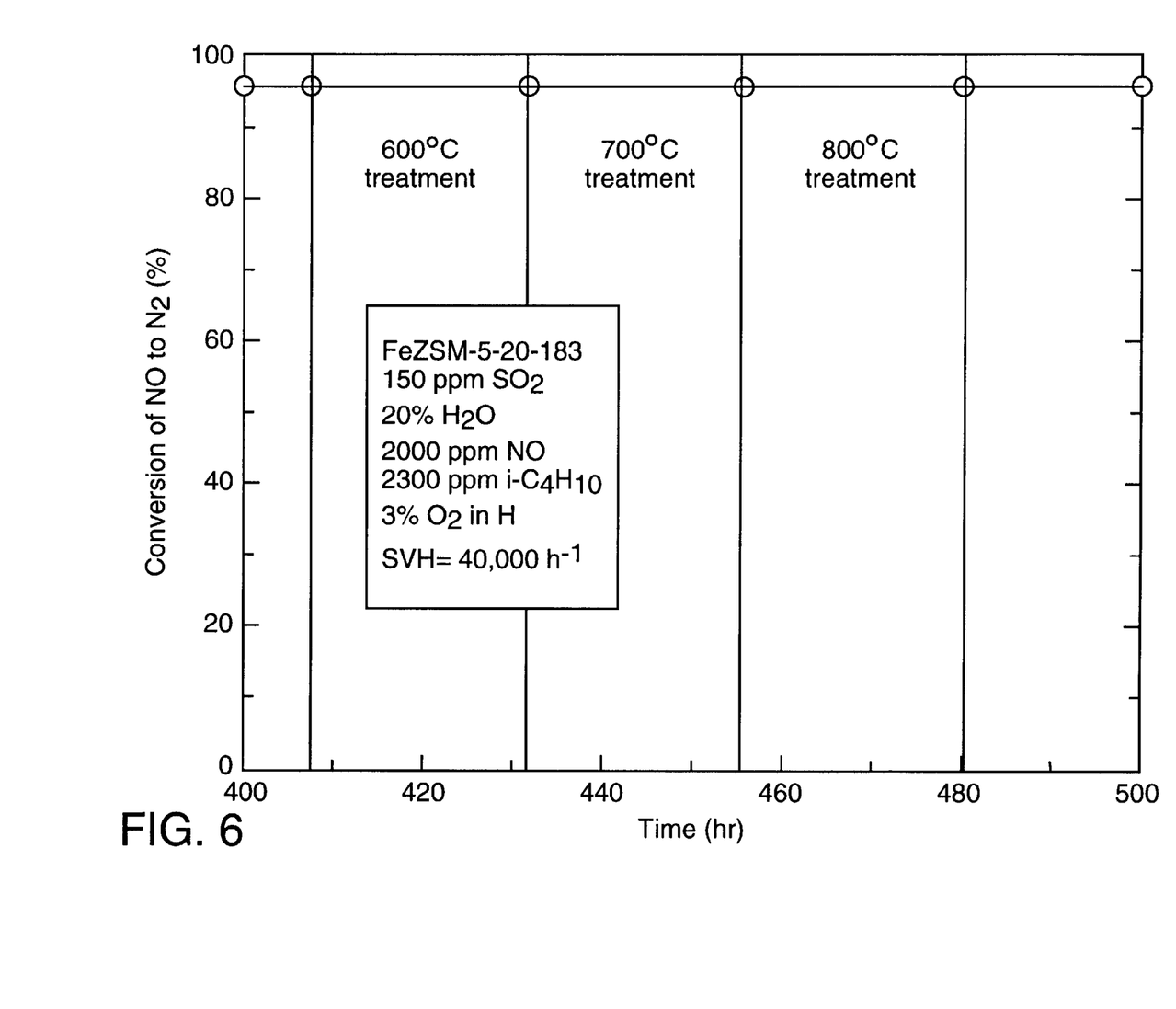
FIG. 6 demonstrates the stability of the catalyst of this invention after high temperature excursions (600° C., 700° C., 800° C.) for periods of 24 hours on $NO_x$ removal activity of the catalyst embodying this invention on return to 500° C.

In FIG. 4, the addition of 250 ppm of $SO_2$ and 250 ppm $SO_2/20\%$ $H_2O$ had no effect on the catalytic activity of the FeZSM-5 catalyst of this invention, whereas CuZSM-5 lost more than 95% of its activity once both $SO_2$ and $H_2O$ were added. After removing $SO_2$ and $H_2O$ from the reactant stream, the CuZSM-5 catalyst recovered only part of its activity, i.e., unlike water alone, the initial activity was not recovered. In FIG. 5, the catalyst FeZSM-5 of this invention shows no deactivation over a period of 2,500 hours with 20% $H_2O$ (100 hours) and combination of 250 ppm $SO_2$ and 20% $H_2O$ (600 hours) present in the exhaust gas stream. At the end of a 408 hour test, the FeZSM-5-20-183 catalyst was treated at 600° C. for 24 hours in the reactant stream (20% $H_2O$, 150 ppm $SO_2$, 2000 ppm NO, 2300 ppm iso-butane, 3% $O_2$ and 77% He) and was followed by measuring catalytic activity at 500° C. Then, the catalyst was treated at 700° C. (24 hr.) followed by measuring catalytic activity at 500° C. and 800° C. (24 hr.) followed by measuring catalytic activity at 500° C. In FIG. 6, the catalyst FeZSM-5 of this invention showed no deactivation after these three high temperature treatments.

EXAMPLE 15

Catalytic Activity of FeMordenite

FeMordenite catalysts have been tested for the efficiency of purifying exhaust gas.

Exhaust gas: 2000 ppm NO, 2000 ppm iso-butane, 3% $O_2$, and 77% He for the makeup gas with a space velocity of 45,000 $h^{-1}$.

Catalyst: Same as Example 8.

Analysis: Same as Example 8.

The maximum $NO_x$ to $N_2$ conversion reaches 30% at a temperature 450° C.

EXAMPLE 16

Catalytic Activity of FeZSM-5 Catalyst with Decane as Reductant

FeZSM-5 catalysts have been tested for the efficiency of purifying exhaust gas with methane as reductant.

Exhaust gas: 2000 ppm NO, 1000 ppm decane, 3% $O_2$, and 77% He for the makeup gas with a space velocity of 45,000 $h^{-1}$.

Catalyst: Same as Example 8.

Analysis: Same as Example 8.

With decane used as reductant, NO to $N_2$ conversion reaches 55% at temperature 650 to 700° C.

A rationale for the extraordinary stability of the FeZSM-5 catalyst made by the special ion exchange procedure (preparation method) described herein above is as follows:

a) The preparation method greatly suppresses the formation of HZSM-5 sites which undergo dealumination readily in the presence of less than 10% water at temperatures as low as 400° C.

b) The suppression of HZSM-5 sites during the ion exchange process is due to the fact that oxalate anion within the pore system tends to remove protons from solution as follows:

Summing the above Equations:

In addition:

Thus, the availability of $H^+$ to protonate the aluminum T-sites is dramatically reduced by the presence of oxalate anion which takes one proton to form $HC_2O_4^-$. It also prevents the oxidation of $Fe^{2+}$ to $Fe^{3+}$ in the form of a separate phase of FeOOH. According to the last equation above, the reaction between $H_2C_2O_4$ and $O_2$ further shifts the equilibrium to remove protons from the solution.

The catalysts were prepared from NaZSM-5; no HZSM-5 was present. The elementary analysis of the FeZSM-5 product shows that the summation of $Fe^{2+}OH^-$ and $Na^+$ is equal to the number of aluminum T-sites in the ZSM-5 framework. This result suggests that all the aluminum T-sites are occupied by either $Fe^{2+}OH^-$ or $Na^+$ cations. Furthermore, the pH of the solution for ion exchange is around 5.5 to 6.5 which means that the concentration of $H^+$ is around $10^{-6}$ molar. The concentration of $Fe^{2+}OH^-$ is more than $10^{-3}$ mole, i.e. 1000 times higher than the $H^+$ in solution.

It is possible to oxidize $Fe^{2+}$ to $Fe^{3+}$ and to reduce $Fe^{3+}$ to $Fe^{2+}$ with a corresponding uptake or loss of O from the finished FeZSM-5 catalyst. However, the $Fe^{2+}$ in the FeZSM-5 cannot be reduced to $Fe^0$ during these processes. There was no reduction of $Fe^{2+}$ to $Fe^0$ even with 100% $H_2$ at temperatures up to 850° C. This again suggests that it is not possible to deposit protons on the ZSM-5 lattice. H-sites are thought to be the major cause of dealumination and lattice breakdown.

Whereas particular embodiment of this invention have been described herein for purposes of illustration and will be evident to those skilled in the art that numerous variations of the details of the present invention may be made without departing from the invention as defined in the appended claims.

We claim:

1. An FeOH catalyst for removing $NO_x$ from exhaust gas by hydrocarbon reduction comprising:
 a zeolite as a support; and
 Fe(II) ion-exchanged cations in said zeolite as an active component in said catalyst for changing $NO_x$ into $N_2$; wherein said Fe(II) cations are in the form of $Fe^{+2}(OH^-)$; and wherein said catalyst has an Fe(II) ion-exchange level of 100% or greater.

2. The catalyst of claim 1 wherein said zeolite is selected from the group consisting of ZSM-5, Faujasite, Ferrierite, and Mordenite.

3. The catalyst of claim 2, wherein said Fe(II) ion-exchange cations are deposited in said zeolite by ion-exchange of Fe(II) salts in the presence of anions selected from the group consisting of oxalate, formate, citrate and 2,3,4,5,6-pentahydroxyl caprociate.

4. The catalyst of claim 3, wherein said catalyst is characterized by having $Fe^{+2}(OH^-)$ cations on its surface that contribute to $NO_x$ removal.

5. The catalyst of claim 4, wherein said Fe(II) salts are selected from the group consisting of Fe(II) sulfate, Fe(II) chloride, Fe(II) nitrate, Fe(II) acetate, Fe(II) formate, Fe(II) oxalate, Fe(II) phosphate, Fe(II) carbonate, Fe(II) carboxylate, and Fe(II) citrate.

6. The catalyst of claim 5, wherein said catalyst is selected from the group consisting of FeOHZSM-5, FeOHFerrierite and FeOHMordenite.

7. The catalyst of claim 6, wherein said catalyst is characterized by a resistance to deactivation over a period of about 2,500 hours by exposure to pollutants in the exhaust stream selected from the group consisting of steam containing water concentrations of about 20% or less, $SO_2$ concentrations of about 250 ppm or less, and combinations thereof.

8. The catalyst of claim 7, wherein said catalyst is characterized by having a selective catalytic reduction efficiency at temperatures between about 450° C. and 550° C. of $\geq 95\%$ and a selectivity of $\geq 0.6$.

9. A method of making an FeOH catalyst for removing $NO_x$ from an exhaust stream wherein said catalyst has an Fe(II) ion-exchange level of 100% or greater and said Fe(II) ions are in the form of $Fe^{+2}(OH^-)$ comprising:
 providing a zeolite selected from the group consisting of ZSM-5, Faujasite, Ferrierite, and Mordenite;
 dissolving Fe(II) salts in the presence of oxidizable anions in an aqueous solution to create $Fe^{+2}(OH^-)$ cations;
 conveying $Fe^{+2}(OH^-)$ cations into said zeolite by ion exchange means;
 reacting dissolved oxygen in said aqueous solution with said oxidizable anions to form $CO_2$;
 controlling the pH range from about 4.5 to 13 during said ion-exchange; and
 employing anaerobic conditions during said ion-exchange.

10. The method of claim 9, wherein said Fe(II) salts employed in said ion-exchange reaction are selected from the group consisting of Fe(II) oxalate, Fe(II) formate, Fe(II) sulfate, Fe(II) chloride, Fe(II) nitrate, Fe(II) acetate, Fe(II) phosphate, Fe(II) carbonate, and Fe(II) carboxylate and the oxidizable anions are selected from the group consisting of oxalate, formate, citrate and 2,3,4,5,6-pentahydroxyl caprociate.

11. The method of claim 10, wherein a catalyst is produced having a selective catalytic reduction efficiency at temperatures of between about 450° C. and 550° C. of $\geq 95\%$ and a selectivity of $\geq 0.6$ in the presence of water concentrations of about 20% or less, $SO_2$ concentrations of about 250 ppm or less, or combinations thereof.

12. The method of claim 11, wherein said catalyst is selected from the group consisting of FeOHZSM-5, FeOHFerrierite and FeOHMordenite.

13. The method of claim 12, employing said catalyst to coat a cordierite monolith used in catalytic converters.

14. A method of removing $NO_x$ from an exhaust stream comprising:
 coating a cordierite monolith with an ion-exchanged zeolite selected from the group consisting of ZSM-5, Faujasite, Ferrierite, and Mordenite;
 using Fe(II) cations in the form of $Fe^{+2}(OH^-)$ ion-exchanged as the active component of said zeolite;
 using an $Fe^{2+}(OH^-)$ ion-exchange level of 100% or greater in said zeolite;
 contacting said exhaust stream with said $Fe^{2+}(OH^-)$ exchanged zeolite using a hydrocarbon to effect reduction of $NO_x$ to $N_2$ thereby removing $NO_x$ from said exhaust stream.

15. The method of claim 14, including employing said catalyst to remove $NO_x$ from an exhaust stream having pollutants selected from the group consisting of steam containing water concentrations of about 20% or less, concentrations of $SO_2$ of about 250 ppm or less, and combinations thereof.

16. The method of claim 15, employing said catalyst over a temperature range of about 200° C. to about 1,000° C. in said exhaust stream.

17. The method of claim 16, employing said catalyst for at least 2,500 hours to convert said $NO_x$ into $N_2$.

18. The method of claim 17, including employing a catalyst having a selective catalytic reduction efficiency at temperatures of between about 450° C. and 550° C. of $\geq 95\%$ when water is present.

19. The method of claim 18, including employing a catalyst selected from the group consisting of FeOHZSM-5, FeOHFerrierite and FeOHMordenite.

* * * * *

UNITED STATES PATENT AND TRADEMARK OFFICE
CERTIFICATE OF CORRECTION

PATENT NO. : 6,033,641
DATED : March 7, 2000
INVENTOR(S) : W. Keith Hall et al.

It is certified that error appears in the above-identified patent and that said Letters Patent is hereby corrected as shown below:

Column 2,
Line 5, remove ".b" after "1995".

Column 10,
Line 54, final formula should read -- $H_2C_2O_4 + 1/2O_2 \Leftrightarrow H_2O + 2CO_2\uparrow$ --.

Column 12,
Line 44, "eflect" should read -- effect --.

Signed and Sealed this

Twenty-second Day of January, 2002

Attest:

JAMES E. ROGAN
*Attesting Officer*     *Director of the United States Patent and Trademark Office*